H. B. PORTER.
SAW SET.
APPLICATION FILED MAY 21, 1910.
1,002,750.
Patented Sept. 5, 1911.
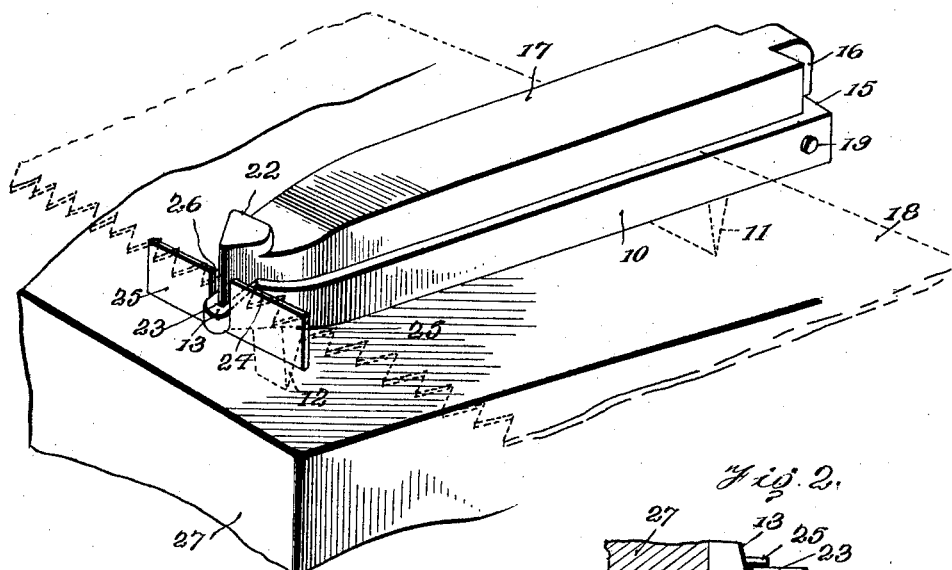
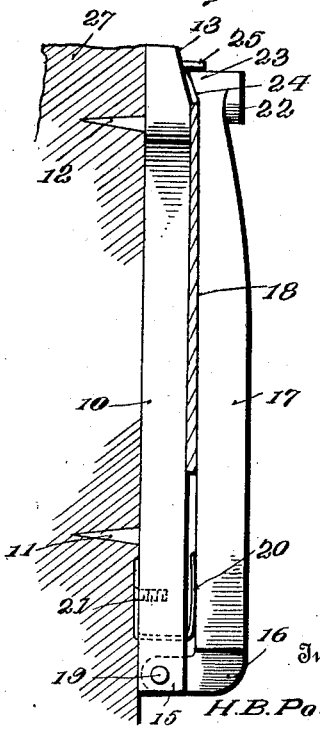
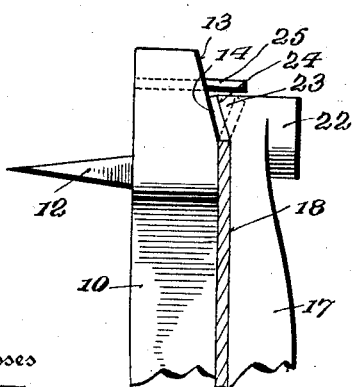
Witnesses
Inventor
H. B. Porter
By
Attorneys

UNITED STATES PATENT OFFICE.

HECTOR B. PORTER, OF WADE, NORTH CAROLINA.

SAW-SET.

1,002,750. Specification of Letters Patent. Patented Sept. 5, 1911.

Application filed May 21, 1910. Serial No. 562,772.

*To all whom it may concern:*

Be it known that I, HECTOR B. PORTER, citizen of the United States, residing at Wade, in the county of Cumberland and State of North Carolina, have invented certain new and useful Improvements in Saw-Sets, of which the following is a specification.

This invention relates to saw-sets, and has for an object to form a compact and neat device of this character, which is readily secured in rigid relation upon a work bench or any other suitable support to receive the retaining spurs, and which may be conveniently carried from place to place as the nature of the work demands.

Another object of this invention is to provide the anvil of the improved set with a gage for positioning the teeth of the saw, and to so form the punch of the set that it conforms to the angle of the anvil and registers with the gage to deflect the alternate teeth of the saw in the same relative angle.

This invention comprehends a saw set with a stock having spurs for detachable engagement in the upper or outer face of a support so that the device may be quickly attached in position wherever it is to be employed.

For a full understanding of the invention reference is to be had to the following description and accompanying drawings, in which:

Figure 1 is a perspective view of the improved set as applied to a horizontal support, and disclosing a saw positioned therein. Fig. 2 is a side elevation of the set as applied to a vertical support and disclosing a section of the saw therein. Fig. 3 is a detail side elevation of the outer end of the set the punch being disclosed in a closed position to rest against the bent tooth of a saw.

Corresponding and like parts are referred to in the following description and indicated in all the views of the accompanying drawings by the same reference characters.

Referring to the drawings the numeral 10 designates the stock of the set which comprises an elongated metallic body having at its opposite ends depending spurs 11 and 12. The outer end of the stock 10 is reduced by the convergence of the edges thereof and is employed as an anvil having an upper inclined face 13 for the reception of the tooth 14 of the saw. The face 13 is inclined at an angle corresponding to the angle into which the tooth is to be bent. The support 12 is positioned beneath the anvil to support the blows which are effected upon the tooth. The inner end of the stock 10 is forked as at 15 to pivotally receive between the arms of the fork a tongue 16.

The tongue 16 forms the inner reduced end of the punch 17 which corresponds in form to the stock 10 and is positioned immediately over the face thereof. It will be observed however, particularly from Fig. 2 that the punch 17 is spaced at its inner end from the stock 10 to admit of the reception of the blade 18 of the saw. The spacing is effected by elongating the tongue 16. A pivot pin 19 is passed through the forked member 15 to hingedly support the tongue 16. The punch 17 is normally held away from the stock 10 by the provision of a leaf spring 20. The leaf spring 20 is bent into U-form and has one arm thereof seated against the inner or under face of the stock 10 to project the central portion of the spring 20 outwardly through the forked member 15. The arms of the spring 20 are so spaced that the outer arm rests yieldingly against the inner or lower face of the punch 17. The spring 20 is held in position by the provision of a screw 21 which passes through the inner arm thereof and into the stock 10. The outer end of the punch 17 is reduced by sloping the edges thereof inwardly and by beveling the upper faces thereof to terminate in a head 22 adapted to receive the blows of a hammer. The head 22 merges into a lip 23 which is formed upon the inner side and at the extremity of the punch 17. The lip provides an inclined face 24 to register with, and to fit against the inclined face 13. The anvil of the stock 10 is provided with a gage 25 comprising a flattened metallic bar which is secured across the outer end of the stock 10 and having an interrupted portion 26 to receive the down-turned point of the tooth 14 and the extremity of the lip 23. The gage 25 is adapted to receive there against the teeth of the saw 18 and to insure the bending of the tooth 14 upon a line in parallel relation with the edge of the saw.

In the use of the set the stock is placed upon the support 27 and, by means of a hammer or the like the spurs 11 and 12 are forced into the support. The stock 10 is then held in position. The punch 17 is now raised and the saw 18 is placed against the outer face of the stock 10 to engage the teeth against the gage 25. When in this position the alternate teeth of the saw are bent downwardly, and to effect such bending the punch 17 is swung inwardly against the saw. The operator strikes the head 22 with a hammer and forces the lip 23 against the teeth 14. As the inclined faces 13 and 24 are arranged in parallel relation and are adapted for registration, the tooth 14 is bent to conform to the angle of the faces. It will be observed from Fig. 2 that the inclined faces 13 and 24 extend inwardly from the extremity of the stock 10 and the punch 17 respectively, and terminate in alinement with the throats of the saw teeth. When the alternate teeth of the saw have been bent in one direction it is only necessary to remove the saw from the set and to turn the blade of the saw over to register the opposite teeth with the lip 23.

Having thus described the invention what is claimed as new is:

A saw-set including a stock for engagement upon a work-table, a punch overhanging the stock in spaced relation thereto and having a depending tongue upon its inner end, a pivot-pin carried by the stock and engaging through the tongue to hingedly support the stock and admit of the raising of the same, said stock having an anvil upon its outer end, said punch having a depending lip upon its outer end registering with the anvil, and a head above the lip to receive the blows of a hammer, and a gage carried by the anvil to center saw-teeth thereon.

In testimony whereof, I affix my signature in presence of two witnesses.

HECTOR B. PORTER. [L. S.]

Witnesses:
JAMES MARSH,
T. M. BLUE.

Copies of this patent may be obtained for five cents each, by addressing the "Commissioner of Patents, Washington, D. C."